United States Patent [19]
Lamy

[11] 3,849,990
[45] Nov. 26, 1974

[54] ANTI-HEAVE PROTECTIVE SYSTEM
[75] Inventor: Jacques Edouard Lamy, Fontenay-Aux-Roses, France
[73] Assignee: C. G. Doris (Compagnie Generale pour les Developpements Operationnels des Richesses Sous-Marines), Paris, France
[22] Filed: Jan. 17, 1973
[21] Appl. No.: 324,305

[30] Foreign Application Priority Data
Jan. 18, 1972 France .............................. 72.01560

[52] U.S. Cl. ................................. 61/3, 61/4, 61/49
[51] Int. Cl. .............................................. E02b 3/06
[58] Field of Search ................ 61/3, 4, 5, 47, 48, 49

[56] References Cited
UNITED STATES PATENTS

| | | | |
|---|---|---|---|
| 1,397,025 | 11/1921 | White | 61/5 |
| 1,819,305 | 8/1931 | Snyder | 61/4 |
| 1,840,271 | 1/1932 | Falley | 61/3 |
| 2,474,786 | 6/1949 | Humphrey | 61/47 X |
| 2,514,119 | 7/1950 | Boccia | 61/4 |
| 2,731,799 | 1/1956 | Lange et al. | 61/4 |
| 2,928,250 | 3/1960 | Smith | 61/5 |
| 3,011,316 | 12/1961 | Wilson | 61/4 |
| 3,118,282 | 1/1964 | Jarlan | 61/4 |
| 3,387,458 | 6/1968 | Jarlan | 61/3 |
| 3,552,131 | 1/1971 | Mott et al. | 61/3 X |

Primary Examiner—W. C. Reynolds
Assistant Examiner—Philip C. Kannan
Attorney, Agent, or Firm—William J. Daniel

[57] ABSTRACT

Anti-heave protective system including especially designed means adapted to slow down ascending and descending water flows against an obstacle exposed to wave and heave action. These means include material elements such as studs, blade portions or a colonnade on which string-courses have been placed, constituting in front of the obstacle, projecting energy dissipating elements over a depth sufficient to penetrate beyond the limit layer of the water mass moving upwards and downwards against the obstacle.

11 Claims, 17 Drawing Figures

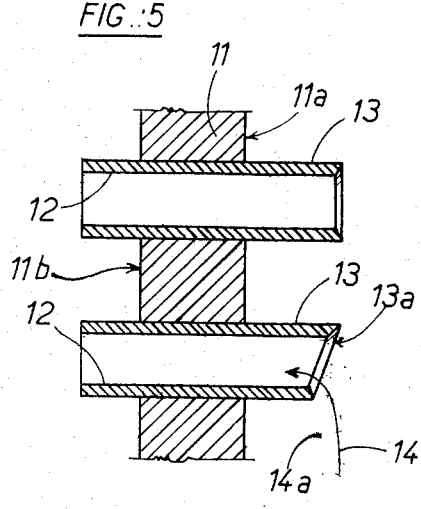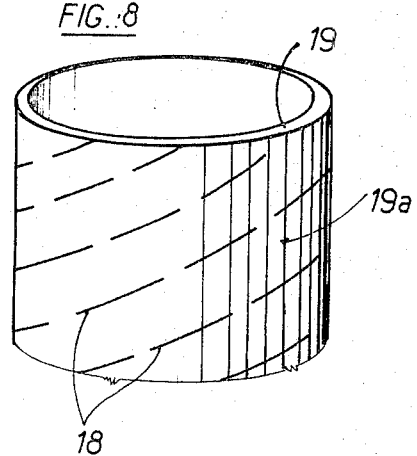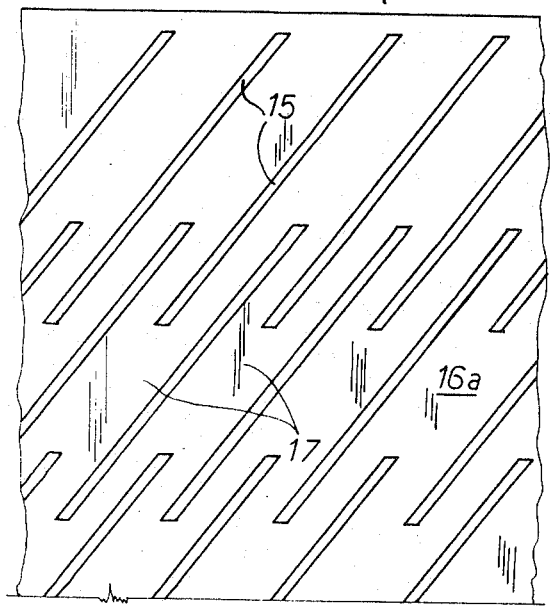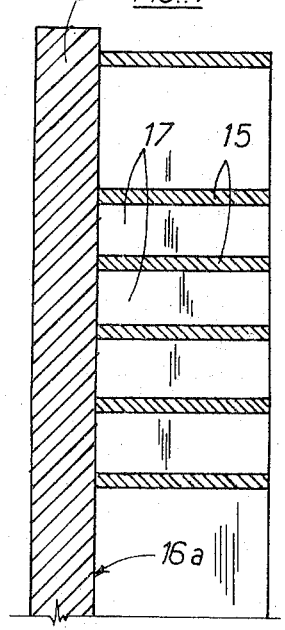

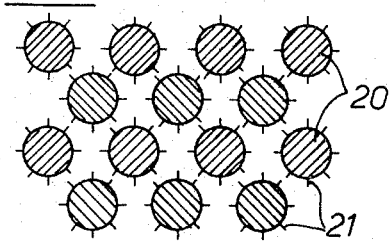
FIG.: 9
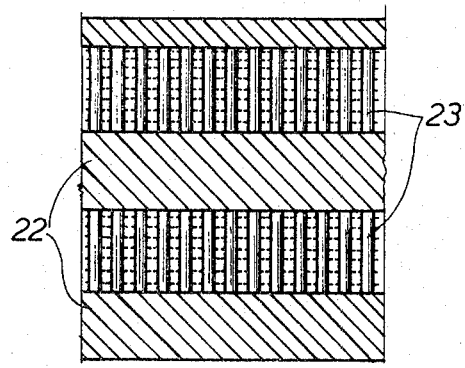
FIG.: 10
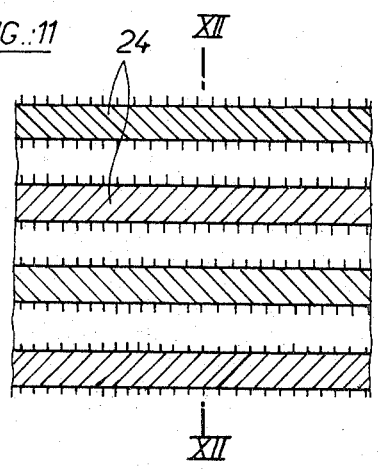
FIG.: 11
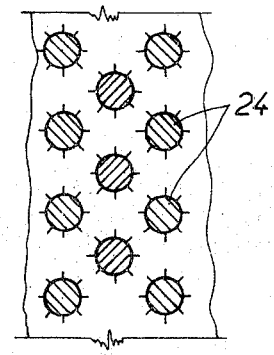
FIG.: 12
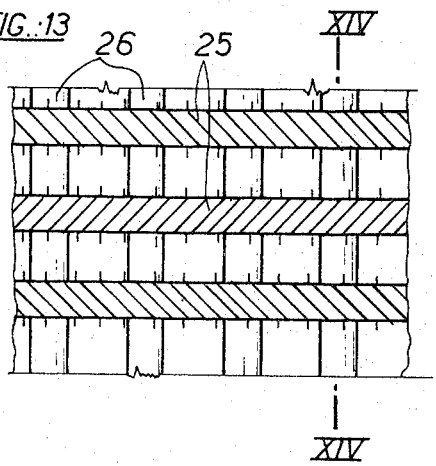
FIG.: 13
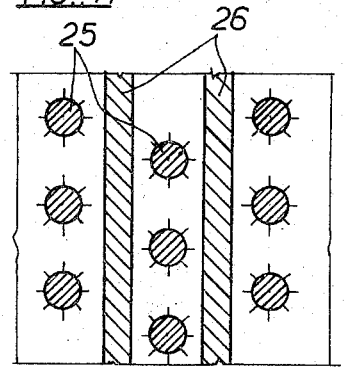
FIG.: 14

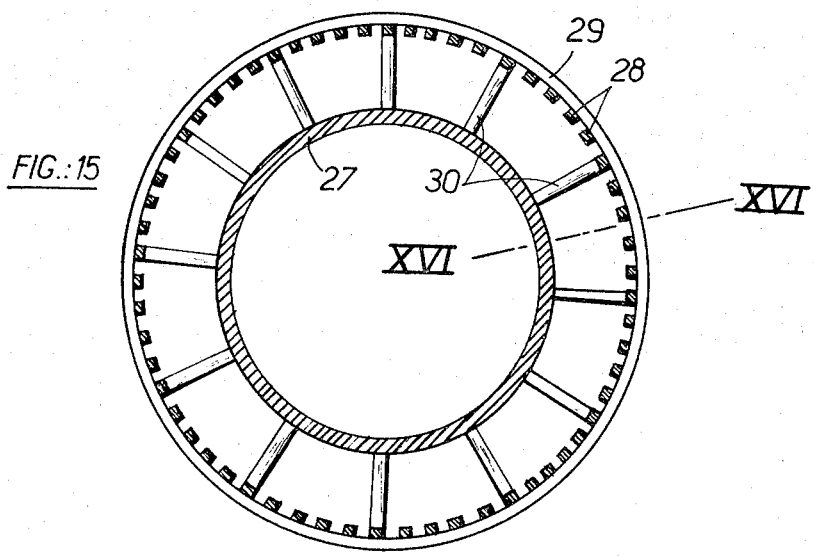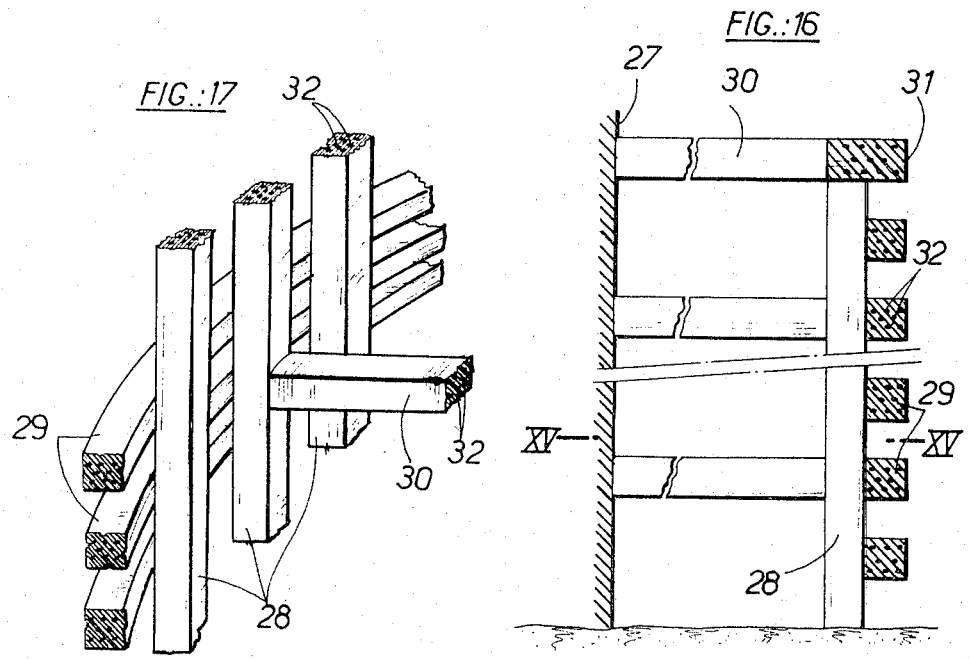

ANTI-HEAVE PROTECTIVE SYSTEM

The invention covers protective systems against wave and heave effects and especially applies to the protection of port facilities and offshore facilities.

The development of problems raised by such facilities, especially related to the development of oil industry and the exploitation of sub-marine deposite, created an increased need for adequate systems likely to protect marine facilities against heave and wave effects. In the existing systems, one mainly attempts to dissipate wave and heave energy, for instance between the blocks of notched part in a conventional breakwater or through the apertures of a perforated caisson breakwater. This invention permits an efficient protection to be achieved using various means which can be used in combination with a breakwater of a known type in order to improve the protection provided by the latter.

It is well known an important effect of an obstacle opposed to heave (for instance a vertical wall opposed to a heave normally oriented to its plane) is the heave reflection on the obstacle against the incident heave. It results in an amplification of the incident heave amplitude on the obstacle, the latter creating a force field which increases the incident energy. A protective system against heave effects will then have to reduce the reflection of the incident heave.

The invention is based on the remark that the reflection occurs while the fluid which has been projected upwards at the time of a surge impact is falling down, and consists in slowing down the energy restitution to the heave through the fluid energy dissipation while it is raising up, then falling down to the obstacle. The raising and falling fluid energy along the obstacle is therefore partially absorbed and phase shifted with respect to the incident heave.

To do this, according to the invention, ascending and descending motions of the fluid are opposed to by energy dissipating material elements projecting in front of the obstacle over a sufficient depth so as to penetrate into the water mass under motion beyond the limit layer.

The material elements can be resting over the surface of the obstacle or arranged against this surface. They must slow down the projection of a water mass well above the incident heave peak level, then slow down water fall along the obstacle. The geometric shapes of the material elements which can be obtained in sculpturing them out of the obstacle or in securing on its surface separated elements, shall be selected so that these elements will rather deeply penetrate beyond the vertically moving limit water layer to efficiently reduce its energy. The sculptures and all other material elements should not create still water zones covered by a limit layer beyond which the running fluid is moving without encountering any obstacle. This is a problem well known in thermal exchanges between a fluid and a thermal wall, the solutions of which can be used, save on the scale, to solve the above mentioned difficulty. According to the invention, the material elements must be separated and discontinuous elements which constitute structures, permitting water drainage and likely to be made under the form of discontinuous inclined slots, studs or bars projecting from the obstacle surface and arranged in staggered relation, as eddy generators or sending the fluid towards shocks against other elements or against other portions of fluid, with cancellation of the trend to create a limit layer.

In one embodiment, the system covered by this invention includes a wall provided, on its front face exposed to heave action, with projecting studs arranged in staggered relation and preferably unevenly distributed. These studs can show, on straight section, asymmetrical profiles and/or inclined profiles over the general direction of the ascending and descending motions of the fluid (i.e., inclined over the vertical line), so as to introduce into these motions a circulation generating fluid deviations and end eddies at the stud ends and therefore an instability of the stud limit layer likely to prevent building up of the limit layer.

The projecting studs can be easily derived, in constructive manner, from other anti-heave systems. They can consist, for instance, in pipes draining water through the apertures of a perforated wall of a breakwater of the perforated caisson type.

In another embodiment, studs can be replaced by a system involving linear slots and baffles. According to the wall construction mode, it can be easier to provide discontinuous linear force motion fendering devices arranged in such a way that they prevent the wall limit layer from being created. For instance, these motion fendering devices can be similar in shape, save on scale, to heat exchanger blades or centrifugal gimblets.

Also in another embodiment, the protective system of the invention involves a plurality of separate obstacle members arranged in staggered relation to provide a substantially uninterrupted impingement area for the heave, a colonnade, for instance.

The following description completed by attached drawings as non limitative examples, will help in explaining how the invention can be achieved, the special characteristics shown on the drawings as well as on the description being of course, part of the said invention;

FIG. 5 shows a partial view similar to that on FIG. 1, showing another modification;

FIG. 6 is a partial view similar to FIG. 2, showing another modification;

FIG. 7 is a vertical cross section following line VII—VII of FIG. 6;

FIG. 8 shows a partial perspective view of a modification concerning the embodiment involved on FIGS. 6 and 7;

FIG. 9 shows a plane view of a protective system including a vertical colonnade;

FIG. 10 shows an elevation view of a modification of the protective system of FIG. 9;

FIG. 11 shows an elevation view of a protective system involving horizontal drums;

FIG. 12 shows a vertical cross section following line XII—XII shown on FIG. 11;

FIG. 13 shows an elevation view of a protective system involving vertical and horizontal drums;

FIG. 14 is a cross section following line XIV—XIV shown on FIG. 13;

FIG. 15 shows a protective system involving horizontal elements resting on columns; cross-section following line XV—XV shown on FIG. 16;

FIG. 16 is a larger scale cross section following line XVI—XVI shown on FIG. 15;

FIG. 17 is a perspective view of a part of the protective system shown on FIGS. 15 and 16.

Figure 1:
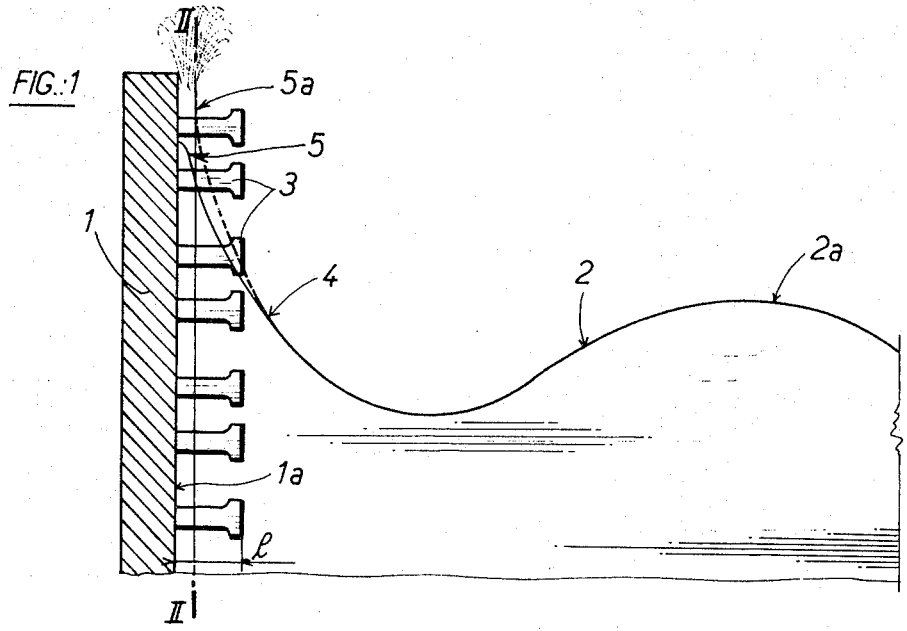
FIG. 1 is a partial view, in vertical cross-section, of a heave protective wall provided with studs.
Figure 2:
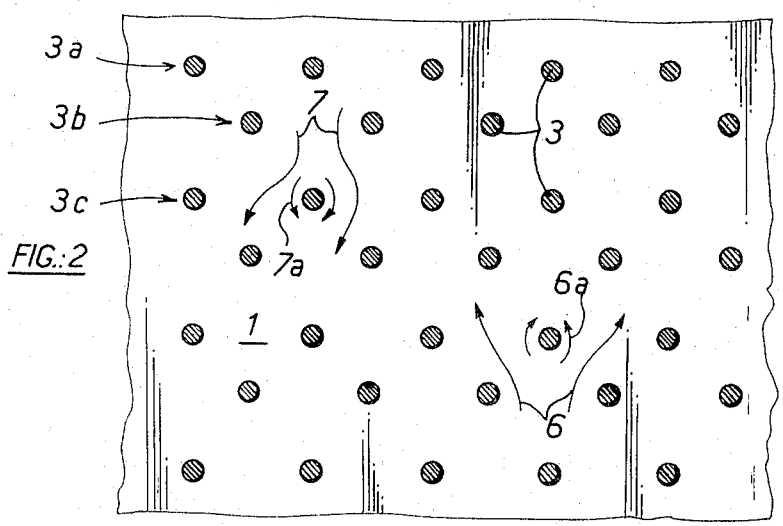
FIG. 2 is a partial elevation view of the wall shown on FIG. 1.

FIGS. 1 and 2 show the upper part of a protective wall 1, whose front surface 1a exposed to heave 2 provides an impingement area therefore and is provided with a plurality of studs 3 arranged in several horizontal rows 3a, 3b, 3c irregularly spaced over a vertical distance. Studs can be arranged in regular staggered relation, as shown, or each stud can be horizontally shifted with respect to the studs included in all other rows. More generally, stud arrangement on surface 1a can be of any other type (i.e., other than horizontal rows); however, vertical distances between the adjacent studs are preferably irregular. In the construction mode shown, studs 3 are projecting over the same length 1 in front of surface 1a, but in other construction modes, length 1 could vary from one stud to another.

When a wave is such that the heave arrives against solid wall 1, a part of its energy is transformed into an ascending vertical motion along surface 1a. Should the wall be smooth (i.e., should it not include studs 3 or equivalent asperities), water would go up, as shown in 5a in dotted line, to a considerable height and would then fall down so generating (or contributing to generate) the well known reflection or underset phenomenon which considerably increases the incident heave energy and aggressiveness.

Studs 3 have a noticeable length 1, as shown on the Figure, so that they extend beyond the limit layer of the fluid which is vertically moving along surface 1a. In other words, studs are not short asperities, the purpose of which would only be to slow down a rather thin fluid layer moving against surface 1a to make it a still water layer in which they would be fully sunk, but they penetrate into the wave beyond this layer. Studs 3 so generate in water going up following arrows 6 (FIG. 2) eddies 6a which reduce its motion, so that is only reach a reduced height as shown on FIG. 1, in 5. Water which goes down then along surface 1a following arrows 7 is falling from a reduced height and therefore with a smaller energy which is still reduced by eddies 7a which are created around studs 3.

Figure 3:
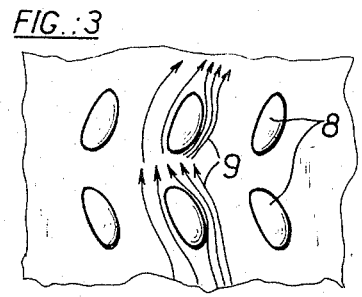
FIG. 3 shows a partial view similar to that shown on FIG. 2, showing a modification.
Figure 4:
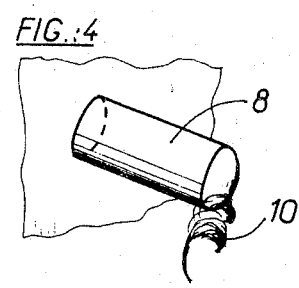
FIG. 4 shows a perspective view of a stud represented on FIG. 3.

In the alternate shown on FIGS. 3 and 4, studs 8 having asymmetrical profiles with respect to the general vertical direction of the ascending and descending fluid flows introduce in a well known manner a circulation of such flows, as shown by ascending current lines schematically drawn in 9. This circulation will increase the energy dissipation and result in fluid deviations and eddies at the stud ends (Prandtl end effect). These eddies have been schematically shown in 10 on FIG. 4, for the descending flow, the deviations and these eddies contribute to the instability of the stud limit layer.

On FIG. 5, wall 11 is the front wall, face 11a of which is exposed to heave effects, of a perforated caisson which reduces the heave energy, in a well known manner, leaving water flowing through holes 12 between face 11a and the caisson included between the other face 11b of the wall and another wall which is not shown on the Figure. According to a particularity of the invention, holes 12 are made in wall 11 (which is made of concrete, for instance) by these pipes 13 projecting on face 11a of the wall, so constituting studs which absorb a part of the ascending and descending flow energy, as it is the case in the construction modes shown on the previous Figures and which modify the flow through holes 12 in attenuating the Borda phenomenon. The ends of pipes 13 can be bevelled as shown in 13a, so permitting the hole output to be modified (preferably in increasing their output while ascending water motions take place, as shown by arrow 14) and eddy generation to be favoured, at pipe ends as shown in 14a.

FIGS. 6 and 7 show an embodiment in which studs have been replaced by discontinuous linear blade sections 15 projecting on face 16a of wall 16. These linear blade sections are inclined laterally and define a plurality of slots 17 therebetween. The inclined and discontinuous arrangement of these blades prevents water from generating still water zones in slots 17.

When the arrangement of the wall or obstacle on which these blades are resting so permits, blades such as blades 15 are spiral wound, so that ascending and descending flows are subject to a centrifugal effect which prevents still water zones from being generated in the slots and limit layer from building up on the blades. For instance on FIG. 8, blades 18 are spiral wound over outside surface 19a of a circular wall 19 designed to protect an offshore structure.

In the embodiment shown on FIGS. 1 through 8, the spreading-out surface of the system, providing the impingement area for the heave and supporting the energy dissipating material elements, is a wall face. However, it could be of advantage to arrange the material elements on a plurality of separate obstacle members staggered in a direction perpendicular to the system spreading-out front surface, to provide the substantially uninterrupted impingement area. For instance one can see on FIG. 9 a colonnade made of several vertical columns 20 arranged in regular staggered relation and provided each with energy dissipating elements 21 which can be studs or any other type of elements as described on the previous Figures. A larger and efficient wet surface is then obtained.

In other embodiments, the obstacle means involves one or several colonnade areas and one or several solid areas. On FIG. 10 for instance, this is a wall which alternatively includes solid horizontal strips 22 and horizontal strips 23 made of colonnades similar to those shown on FIG. 9. This arrangement permits a cheaper cost and reduces the difficulty likely to be encountered when constructing the obstacle in placing the most efficient part of the latter approximately at the medium water level in calm weather, and in affecting the tide zone by proper heave amplitude margins. It goes without saying that the columns can be of any section, polygonal with rectilinear sides, convex or concave for instance, and that a more or less strict alternation can be provided between solid portions and colonnades.

The colonnade shown on FIG. 9 or the colonnade areas such as those shown on FIG. 10 can be replaced by several horizontal drums 24 arranged in regular staggered relation (FIGS. 11 and 12) or by horizontal drums 25 crossed with vertical drums 26 (see FIGS. 13 and 14).

The protection constituted by colonnades, horizontal or crossed drums, or by their alternation with solid zones will follow the contour of the structure to be protected, at a convenient distance from the latter. This structure could be a beach, a wharf or a tank which will be enclosed by the protective system. The distance between the structure and the system will be defined taking into account the residual heave reflected by the structure, on which the protective system operates from its rear face to reduce it. This distance can be small.

When the structure to be protected (wharf or tank, for instance) includes a vertical or almost vertical wall, it can constitute with the protective colonnades installed behind it a kind of caisson acting as a perforated caisson in order to contribute to the heave energy dissipation.

It should be noted that in a protective system made of concrete, including solid portions alternating with colonnades or horizontal or crossed drums zones, the columns or drums can be used to pass prestress steel reinforcing elements ensuring the strength of the structure and columns proper (or drums). These steel reinforcing elements can be cables passing through pipes which are then filled of concrete to obtain the columns or drums. This remark especially shows that in addition to their heave reducing effect, horizontal drums can also play a very useful part in the structure strength.

FIG. 15 shows a circular wall 27 designed to protect an offshore structure (not shown on the Figure). At a certain distance ahead of wall 27, some columns 28 have been arranged in crown to support several horizontal elements or string-courses 29 forming with the columns a kind of grid, as shown on FIG. 17. The structure including wall 27 and grid 28,29 as completed by several braces 30 connecting the wall and the grid. The structure is made of reinforced concrete and, to facilitate building operations, columns 28, string-courses 29 and braces 30 are rectangular in section. Grid 28,29 is capped by an upper string-course or roofing 31 which is also rectangular in section. Prestress steel reinforcing units 32 pass through the columns, drums and braces.

I claim:
1. Protective system against the heaving action of waves of water comprising a bulky obstacle means having a spreading-out surface and providing a substantially uninterrupted impingement area of substantial extent athwart the wave path and exposed to the impact of successive surges of the heave to induce along said spreading-out surface alternate ascending and descending motions of a mass of water of a thickness greater than a limit layer of water, and means providing a multiplicity of energy dissipating material elements distributed over and projecting in front of said spreading-out surface a distance sufficient to penetrate into said mass of water beyond said limit layer, said elements serving to slow down ascending and descending water motions and phaseshift the same with respect to the heave.

2. System according to claim 1, in which the material elements comprise linear baffle members in the form of blade sections laterally inclined to the vertical.

3. System according to claim 2, in which the obstacle means comprises a circular wall and the blade sections are spiral wound.

4. System according to claim 1, in which the material elements comprise studs.

5. System according to claim 4, in which the studs are spaced irregularly in a vertical direction.

6. System according to claim 4, in which the studs are arranged in staggered relation.

7. System according to claim 4, in which the studs are asymmetrical in cross-section.

8. System according to claim 4, in which the studs are inclined in profile laterally relative to the general direction of the ascending and descending water motions.

9. System according to claim 4, in which the obstacle means comprises a perforated wall, and the studs are formed by projecting portions of pipes limiting the wall perforations.

10. System according to claim 9, in which the perforated wall is the front wall of a perforated caisson.

11. System according to claim 9, in which the projecting pipe portions have bevelled ends oriented downwards.

* * * * *

UNITED STATES PATENT OFFICE
CERTIFICATE OF CORRECTION

Patent No. 3,849,990     Dated November 26, 1974

Inventor(s) Jacques Edouard Lamy

It is certified that error appears in the above-identified patent and that said Letters Patent are hereby corrected as shown below:

In The Abstract: line 9, Column 1, lines 42 and 55, Column 2, lines 13, 14 and 24, Column 3, line 34, Column 4, line 24, "limit", each occurrence, should read -- boundary --. Column 1, lines 52 and 53, delete "vertically moving limit water layer" and insert -- boundary layer of the water moving vertically along the obstacle --. In Claim 1, line 6, delete "along" line 7, delete "said spreading out surface"; line 8, delete "of a thickness" and insert -- along said spreading out surface beyond a boundary --; line 9, delete "greater than a limit"; line 13, delete "limit" and insert -- boundary --.

Signed and Sealed this thirtieth Day of September 1975

[SEAL]

Attest:

RUTH C. MASON
*Attesting Officer*

C. MARSHALL DANN
*Commissioner of Patents and Trademarks*